UNITED STATES PATENT OFFICE.

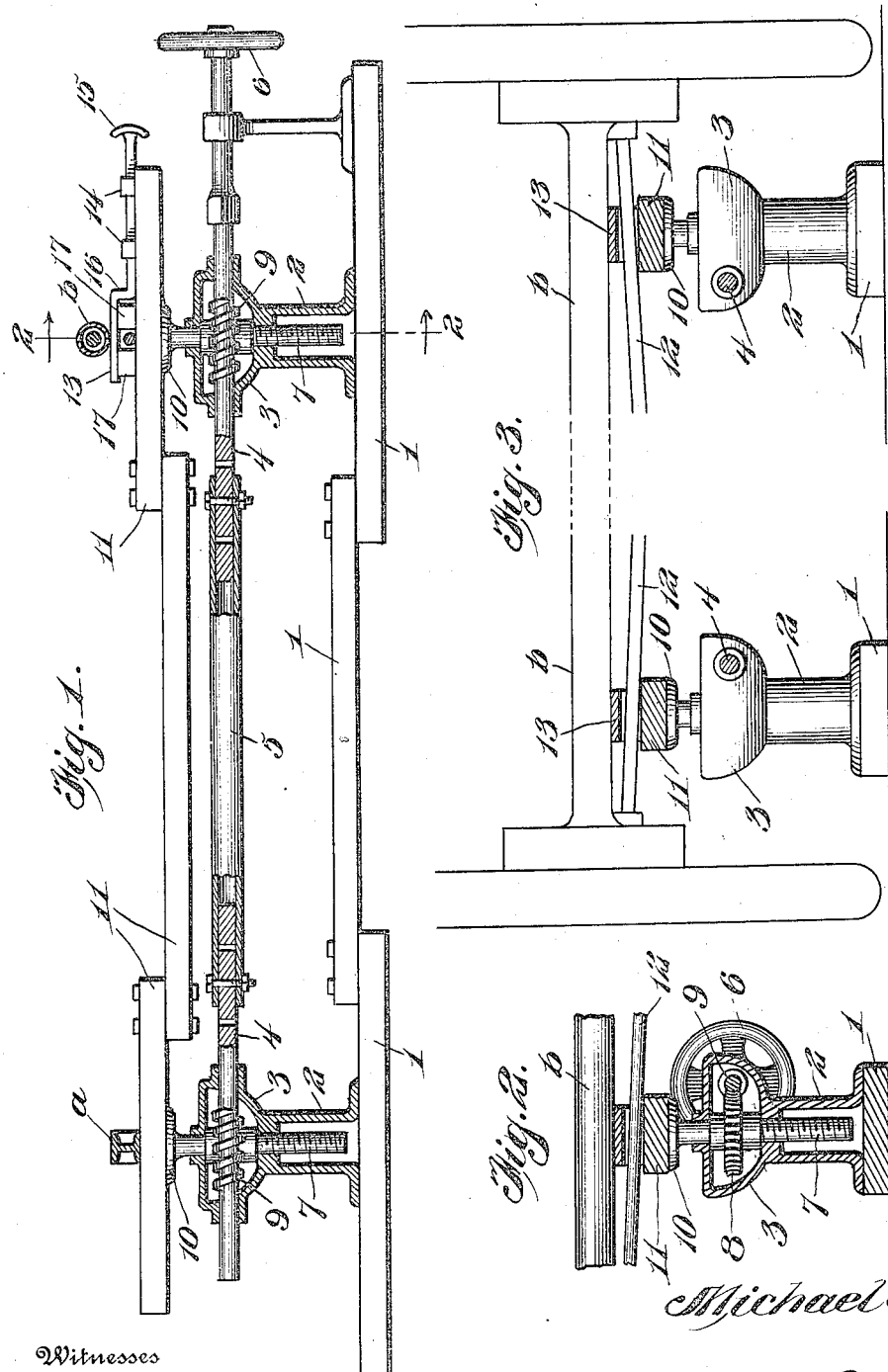

MICHAEL STOUDT, OF DUNKIRK, INDIANA, ASSIGNOR OF ONE-HALF TO LE ROY CROZIER, OF DUNKIRK, INDIANA.

VEHICLE-JACK.

1,243,360.  Specification of Letters Patent.  Patented Oct. 16, 1917.

Application filed April 26, 1916. Serial No. 93,677.

*To all whom it may concern:*

Be it known that I, MICHAEL STOUDT, a citizen of the United States, residing at Dunkirk, in the county of Jay and State of Indiana, have invented new and useful Improvements in Vehicle-Jacks, of which the following is a specification.

This invention relates to vehicle jacks especially designed for use in connection with four wheeled vehicles such as automobiles, motor trucks and the like, the broad object in view being to produce a jack which will operate simultaneously on the front and rear axles of such a vehicle and elevate said axles so as to lift the tires of the wheels out of engagement with the ground or floor, thereby taking the weight of the machine off the tires and incidentally increasing the life of the latter.

One of the main objects of the present invention is to provide a jack of the general character referred to by means of which the front axle and the rear axle housing are directly supported without imposing any weight or strain on the usual truss rod which is terminally connected to the end portions of the rear axle housing and passes centrally under the housing of the rear differential gearing.

With the above and other objects in view, the invention consists in the novel construction, combination and arrangement of parts, as herein described, illustrated and claimed.

In the accompanying drawings:—

Figure 1 is a vertical longitudinal section taken through a jack embodying the present invention and also illustrating the front and rear axle housings and the rear axle truss rod in cross section.

Fig. 2 is a vertical cross section on the line 2—2 of Fig. 1.

Fig. 3 is a rear elevation of the rear axle and wheels of a motor vehicle, illustrating the relation of a pair of jacks to the rear axle.

In connection with a four wheeled vehicle having front and rear axles indicated respectively at *a* and *b*, I employ two jacks, the construction of one of which is illustrated in Figs. 1 and 2 and the arrangement of a pair of which is illustrated in Fig. 3 in their relation to the rear axle housing of a motor vehicle.

Each jack comprises a substantially horizontal base 1 upon which and adjacent to the opposite ends thereof are mounted jack screw casings 2 the upper end of each casing 2 being enlarged at 3 to form a gear housing through which passes one of the end sections 4 of a jack shaft, said shaft, in the preferred embodiment of the invention, comprising a central tubular member 5 which is fastened at its opposite ends to the terminal portions 4 of the shaft as shown. Fastened to one end of the jack shaft is an operating element 6 shown in the form of a hand wheel by means of which the jack shaft may be turned for a purpose which will appear. Within each casing 2 is a vertical jack screw 7 which passes through an internally threaded worm gear 8 journaled in the expanded upper portion 3 of the casing 2, the wheel 8 being actuated by means of a worm 9 fast on the adjacent terminal portion 4 of the jack shaft.

Each of the jack screws 7 is provided at its upper end with a head 10. An axle supporting rail 11 extends from one head 10 to the other and is fastened in any suitable way thereto and thereon. The front axle may bear directly on the supporting rail 11 but on account of the truss rod 12 which extends under the rear axle housing, the latter cannot bear directly on the rail 11 and therefore I employ in connection with each axle supporting rail 11, a slidable rest 13 movable longitudinally of the axle supporting rail 11 and passing through one or more guides 14 on the rail 11. The rest 13 is provided at its outer extremity with an operating handle 15 and is offset at 16 to elevate the rest proper indicated at 13. The free or unsupported end of the rest 13, when in its proper position, is supported by blocks 17 underlying the same and fastened to the rail 11.

After the vehicle has been propelled over the jacks and the front and rear axles have been brought into the proper relation to the axle supporting rails 11 with the truss rod 12 close to the blocks 17 of both jacks, the slidable rests 13 are moved inwardly to the position shown in Fig. 1. Then by revolving the jack shafts, the supporting rails 11 are elevated thereby jacking up the vehicle, the rear axle housing being supported by the rests 13 thereof, while the truss rod 12 passes under the rests 13 and between the latter and the tops of the rails 11. This prevents bending, straining or otherwise injuring the truss rod 12 while at the same time the front and rear axles of the machine are equally and correspondingly raised.

I claim:—

In a jack of the class specified, the combination of a base, a pair of jack screw casings and gear housings extending upwardly from said base adjacent to the opposite ends of the latter, jack screws movable vertically in said casings, an axle supporting rail supported by said jack screws and adapted to be moved upwardly and downwardly thereby, a rotary jack shaft journaled in both of said housings, worms on said jack shaft within said housings, worm wheels actuated by said worms and having a threaded engagement with said jack shafts and contained within said housings, a slidable axle rest on said axle supporting rail having a portion thereof in spaced parallel relation to said rail, and a rest supporting block upon which said parallel portion of the axle rest is supported when the latter is in its using position.

In testimony whereof I affix my signature.

MICHAEL STOUDT.

Witnesses:
 BRENTA HIGMAN,
 RICHARD J. SUTTON.

Copies of this patent may be obtained for five cents each, by addressing the "Commissioner of Patents, Washington, D. C."